(12) United States Patent
Blaszczak

(10) Patent No.: US 7,930,432 B2
(45) Date of Patent: Apr. 19, 2011

(54) SYSTEMS AND METHODS FOR DISTRIBUTING A WORKPLAN FOR DATA FLOW EXECUTION BASED ON AN ARBITRARY GRAPH DESCRIBING THE DESIRED DATA FLOW

(75) Inventor: Michael A. Blaszczak, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/882,497

(22) Filed: Jun. 30, 2004

(65) Prior Publication Data

US 2005/0278152 A1 Dec. 15, 2005

Related U.S. Application Data

(60) Provisional application No. 60/573,963, filed on May 24, 2004.

(51) Int. Cl.
*G06F 15/16* (2006.01)
*G06F 7/00* (2006.01)

(52) U.S. Cl. .......................................... 709/246; 707/756
(58) Field of Classification Search .................. 709/246; 707/101; 711/111, 117
See application file for complete search history.

(56) References Cited

U.S. PATENT DOCUMENTS

| | | | |
|---|---|---|---|
| 4,783,760 A | 11/1988 | Carosso | |
| 4,799,152 A | 1/1989 | Chuang et al. | 364/200 |
| 5,535,378 A | 7/1996 | Arnold | |
| 5,844,794 A | 12/1998 | Keeley | 364/138 |
| 6,016,497 A | 1/2000 | Suver | 707/103 |
| 6,023,704 A | 2/2000 | Gerard et al. | |
| 6,092,071 A | 7/2000 | Bolan et al. | 707/101 |
| 6,112,207 A | 8/2000 | Nori et al. | 707/101 |
| 6,208,990 B1 | 3/2001 | Suresh et al. | |
| 6,230,212 B1 | 5/2001 | Morel et al. | 709/316 |

(Continued)

FOREIGN PATENT DOCUMENTS

WO    WO 01/38967    5/2001

OTHER PUBLICATIONS

Shek, E.C. et al., "Exploiting Data Lineage for Parallel Optimization in Extensible DBMSs," IEEE: Proceedings of the 15$^{th}$ International Conference on Data Engineering, Sydney Australia, Mar. 23-26, 1999, 256.

(Continued)

*Primary Examiner* — Nathan Flynn
*Assistant Examiner* — Chirag R Patel
(74) *Attorney, Agent, or Firm* — Woodcock Washburn LLP

(57) ABSTRACT

Various embodiments of the present invention are directed to the creation of multiple redundant chains of transforms, each on a separate processing thread, for a data flow execution (DFE) of a data transformation pipeline (DTP). For certain of these embodiments, a "distributor" receives a buffer as input and directs that buffer to one of several parallel identical threads to process that buffer. A scheduler would create each of these multiple threads, each thread having an identical (redundant) strings of transforms (chains) downstream from the distributor, and all of which would lead even further downstream to a collector that is responsible for collecting and, if necessary, ordering the buffers processed by the previous redundant chains. In this way, the distributors and collectors provide increased scalability for the pipeline by implicitly partitioning (distributing) individual buffers to one of many threads for at least a part of their execution/processing.

24 Claims, 14 Drawing Sheets

U.S. PATENT DOCUMENTS

| | | | |
|---|---|---|---|
| 6,292,804 | B1 | 9/2001 | Ardoin et al. |
| 6,567,816 | B1 | 5/2003 | Desai et al. |
| 6,789,096 | B2 | 9/2004 | Sankaran et al. |
| 6,850,947 | B1 * | 2/2005 | Lim et al. ............... 707/101 |
| 6,886,082 | B1 | 4/2005 | Furusho |
| 7,062,758 | B2 | 6/2006 | Yokoyama |
| 7,080,088 | B1 | 7/2006 | Lau |
| 7,103,590 | B1 | 9/2006 | Murthy et al. |
| 7,143,247 | B1 * | 11/2006 | Grossier ............... 711/154 |
| 7,170,511 | B2 | 1/2007 | Sowizral et al. |
| 7,299,216 | B1 | 11/2007 | Liang et al. |
| 2002/0161907 | A1 | 10/2002 | Moon |
| 2003/0103073 | A1 | 6/2003 | Yokoyama |
| 2003/0172368 | A1 | 9/2003 | Alumbaugh et al. |
| 2003/0219072 | A1 | 11/2003 | MacInnis et al. |
| 2004/0085999 | A1 | 5/2004 | Burnett et al. |
| 2004/0186843 | A1 | 9/2004 | Blaszczak et al. |
| 2004/0186915 | A1 | 9/2004 | Blaszczak et al. |
| 2004/0205452 | A1 | 10/2004 | Fitzsimmons et al. |
| 2005/0015732 | A1 | 1/2005 | Vedula et al. |

OTHER PUBLICATIONS

Marathe, A.P. et al., "Tracing Lineage of Array Data," IEEE: Proceedings of the 13$^{th}$ International Conference on Scientific and Statistical Database Management, Fairfax, Virginia, Jul. 18-20, 2001, 69-78.

In the United States Patent and Trademark Office, in re.: U.S. Appl. No. 10/391,726 filed Mar. 18, 2003, Advisory Action dated Dec. 11, 2007, 3 pages.

In the United States Patent and Trademark Office, in re.: U.S. Appl. No. 10/391,726 filed Mar. 18, 2003, Final Office Action dated Aug. 7, 2007, 11 pages.

In the United States Patent and Trademark Office, in re.: U.S. Appl. No. 10/391,726 filed Mar. 18, 2003, Final Office Action dated Feb. 6, 2009, 11 pages.

In the United States Patent and Trademark Office, in re.: U.S. Appl. No. 10/391,726 filed Mar. 18, 2003, Non-Final Office Action dated Dec. 21, 2006, 5 pages.

In the United States Patent and Trademark Office, in re.: U.S. Appl. No. 10/391,726 filed Mar. 18, 2003, Non-Final Office Action dated Jun. 6, 2008, 11 pages.

In the United States Patent and Trademark Office, in re.: U.S. Appl. No. 10/391,726 filed Mar. 18, 2003, Non-Final Office Action dated Mar. 19, 2007, 9 pages.

In the United States Patent and Trademark Office, in re.: U.S. Appl. No. 10/681,610 filed Oct. 8, 2003, Final Office Action dated Sep. 1, 2009, 12 pages.

In the United States Patent and Trademark Office, in re.: U.S. Appl. No. 10/681,610 filed Oct. 8, 2003, Final Office Action dated Sep. 5, 2008, 22 pages.

In the United States Patent and Trademark Office, in re.: U.S. Appl. No. 10/681,610 filed Oct. 8, 2003, Non-Final Office Action dated Feb. 17, 2009, 11 pages.

In the United States Patent and Trademark Office, in re.: U.S. Appl. No. 10/681,610 filed Oct. 8, 2003, Non-Final Office Action dated Mar. 12, 2008, 21 pages.

U.S. Appl. No. 10/681,610: Non Final Rejection, Apr. 1, 2010.

* cited by examiner

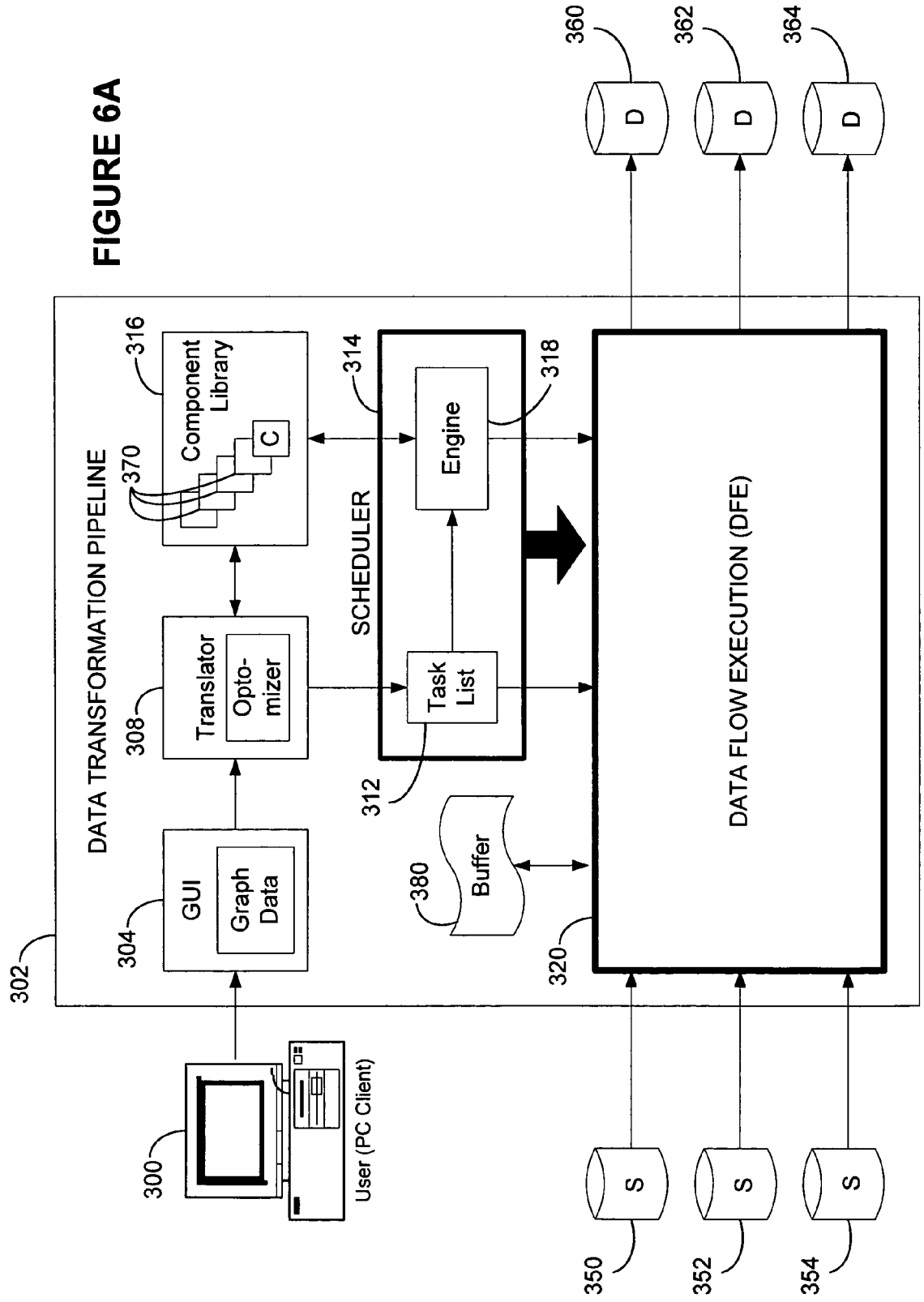

SYSTEMS AND METHODS FOR DISTRIBUTING A WORKPLAN FOR DATA FLOW EXECUTION BASED ON AN ARBITRARY GRAPH DESCRIBING THE DESIRED DATA FLOW

CROSS-RELATED APPLICATIONS

This application claims benefit of U.S. Provisional Application No. 60/573,963, entitled "SYSTEMS AND METHODS FOR DISTRIBUTING A WORKPLAN FOR DATA FLOW EXECUTION BASED ON AN ARBITRARY GRAPH DESCRIBING THE DESIRED DATA FLOW", filed May 24, 2004, the entire contents of which are hereby incorporated herein by reference.

This application is also related to the following commonly-assigned patent applications, the entire contents of each are hereby incorporated herein this present application by reference: U.S. patent application Ser. No. 10/681,610, entitled "SYSTEMS AND METHODS FOR TRANSFORMING DATA IN BUFFER MEMORY WITHOUT UNNECESSARILY COPYING DATA TO ADDITIONAL MEMORY LOCATIONS", filed Oct. 8, 2003; which is a continuation-in-part of U.S. patent application Ser. No. 10/391,726, entitled "SYSTEMS AND METHODS FOR SCHEDULING DATA FLOW EXECUTION BASED ON AN ARBITRARY GRAPH DESCRIBING THE DESIRED DATA FLOW", filed Mar. 18, 2003.

FIELD OF THE INVENTION

The present invention relates generally to database systems and, more particularly, to systems and methods for distributing a workplan for data flow execution based on an arbitrary graph describing the desired flow of data from at least one source to at least one destination.

BACKGROUND OF THE INVENTION

A relational database is a collection of related data that can be represented by two-dimensional tables of columns and rows wherein information can be derived by performing set operations on the tables, such as join, sort, merge, and so on. The data stored in a relational database is typically accessed by way of a user-defined query that is constructed in a query language such as Structured Query Language (SQL).

Often it is useful to extract data from one or more sources, transform the data into some more useful form, and then load the results to a separate destination. A data warehouse, for example, is a central repository for all or significant parts of the data that an entity's various business systems collect and store (often in separate databases), the purpose of the data warehouse being to support data mining, decision support systems (DSS), and other data actions. Data from various sources is selectively extracted and organized on the data warehouse database for use by analytical applications and user queries. Data warehousing emphasizes the capture of data from diverse sources for useful analysis and access.

In the context of a data warehousing, and more generally for managing databases, extract-transform-load (ETL) refers to three separate functions of obtaining, processing, and storing data. The extract function reads data from a specified source database and extracts a desired subset of data. The transform function works with the acquired data—using rules or lookup tables, or creating combinations with other data—to convert it to the desired state as defined by the specific ETL tool. The load function is used to write the resulting data (either all of the subset or just the changes) to a destination database. Various and diverse ETL tools can be used for many purposes, including populating a data warehouse, converting a database of a specific type into a database of another type, or migrating data from one database to another.

In general, ETL tools operate to perform the aforementioned simple three-step process: (a) the ETL tool extracts the data from the source; (b) the ETL tool transforms the data according to its predefined functionality; and (c) the ETL tool loads the data to the destination. However, while basic transformations can be achieved with simple ETL tools, complex transformations require custom development of new ETL tools with specific and complex functionality—an approach that is resource intensive. While simple ETL tools might have broader usability and thus naturally lend themselves to widespread reuse, complex ETL tools do not lend themselves to reusability due to their high customization and narrow utility (and thus the frequent need to custom develop complex ETL tools when they are needed).

U.S. patent application Ser. No. 10/391,726, entitled "SYSTEMS AND METHODS FOR SCHEDULING DATA FLOW EXECUTION BASED ON AN ARBITRARY GRAPH DESCRIBING THE DESIRED DATA FLOW", filed Mar. 18, 2003 is directed toward database technology that provides users with a means for developing complex transformation functionality that is more efficient than custom development of complex ETL tools. That application discloses a system and method for scheduling data flow execution based on an arbitrary graph describing the desired flow of data from at least one source to at least one destination. The data transformation system (DTS) in one embodiment of the that application comprises a capability to receive data from a data source, a data destination and a capability to store transformed data therein, and a data transformation pipeline (DTP) that constructs complex end-to-end data transformation functionality (data flow executions or DFEs) by pipelining data flowing from one or more sources to one or more destinations through various interconnected nodes (that, when instantiated, become components in the pipeline) for transforming the data as it flows by (where the term transforming is used herein to broadly describe the universe of interactions that can be conducted to, with, by, or on data). Each component in the pipeline possesses specific predefined data transformation functionality, and the logical connections between components define the data flow pathway in an operational sense.

The data transformation pipeline (DTP) enables a user to develop complex end-to-end data transformation functionality (the DFEs) by graphically describing and representing, via a graphical user interface (GUI), a desired data flow from one or more sources to one or more destinations through various interconnected nodes (a graph). Each node in the graph selected by the user and incorporated in the graph represents specific predefined data transformation functionality (each a component), and connections between the nodes (the components) define the data flow pathway.

After the user inputs a graph, the DTP's scheduler traverses the graph and translates the graph into lists of specific work items comprised of a relatively small set of functionality necessary to efficiently obtain data from an external source, route data from transformation process to transformation process (component to component) as reflected in the graph, and then release the resultant data to an external target destination. Despite its name, the scheduler does not schedule work items into time slots, but instead it forms work lists and then manages the operation of the work items in the lists. As such, the scheduler work items comprise the following elements of functionality (each discussed in more detail herein):

obtaining data from a data source
providing data to a component
enabling the split of data along two or more paths
enabling the merger data from two or more paths into a single path
passing data to a thread
waiting for and receiving data from a thread DTS also provides a multitude of components with defined inputs and outputs, whereby the user can graphically construct complex data transformations to combine the functionality of the components to achieve the desire end results. These components, similar to a plurality of ETL tools but lacking the individual functionality of ETL tools to extract and load data (as these tasks are handled by the scheduler in the DTP subsystem), provide black box transformation functionality—that is, components can be developed on a variety of platforms (Java, ActiveX, etc.), but the development platform is irrelevant to the DTP as it (and the user) are only concerned about the inputs, outputs, and transformation functionality.

Adding to the efficiency of the system, the DTP also utilizes a unique memory management scheme whereby data extracted from an external source is placed in a memory buffer where it is then manipulated by the components without the need for copying. This technology is discussed in U.S. patent application Ser. No. 10/681,610, entitled "SYSTEMS AND METHODS FOR TRANSFORMING DATA IN BUFFER MEMORY WITHOUT UNNECESSARILY COPYING DATA TO ADDITIONAL MEMORY LOCATIONS", filed Oct. 8, 2003.

SUMMARY OF THE INVENTION

Several embodiments of the present invention are directed to systems and methods for distributing work of a data flow engine across multiple processors to improve performance in connection with data flow handling systems. Given a data flow, various embodiments provide for the addition of a "distributor" and a "collector" to a planned workflow to make a pipeline more scaleable by enabling implicit partitioning whereby buffers are distributed to multiple threads for at least a part of their execution. Distributors act on complete sets of buffered data ("buffers") in each operation—that is, they take a single buffer as input and direct that buffer to one of several threads to actually process the buffer. By using multiple threads with redundant strings of transforms ("chains") downstream from a distributor, the same work can be done on several buffers concurrently and, thus, the resources of a machine running the pipeline are more effectively and aggressively utilized. Downstream from the redundant chains, in turn, is a collector that is responsible for collecting and possibly ordering the buffers which were processed by the previous redundant chains. In this way, a substantial scalability increase can be found by increasing the number of processors—that is, the computer system nets a runtime performance increase in proportion to the number of processors available to the system and utilized for parallel processing of the buffers in the redundant chains. In addition, several embodiments of the present invention are directed to the utilization of a unique memory management scheme for distributing work of a data flow engine across multiple processors to improve performance in connection with data flow handling systems.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6A is an illustration of the functional structure of one embodiment of a data transformation pipeline;

DETAILED DESCRIPTION OF ILLUSTRATIVE EMBODIMENTS

Overview

The following discussion is directed to systems and methods for distributing work of a data flow engine across multiple processors to improve performance in connection with data flow handling systems. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies. Moreover, where the embodiments described herein describe the invention in connection with row-level access and processing, it should be noted that the invention is by no means limited to row-level access and processing and could be applied on a column basis or a table basis as well.

Computer Environment

Figure 1:
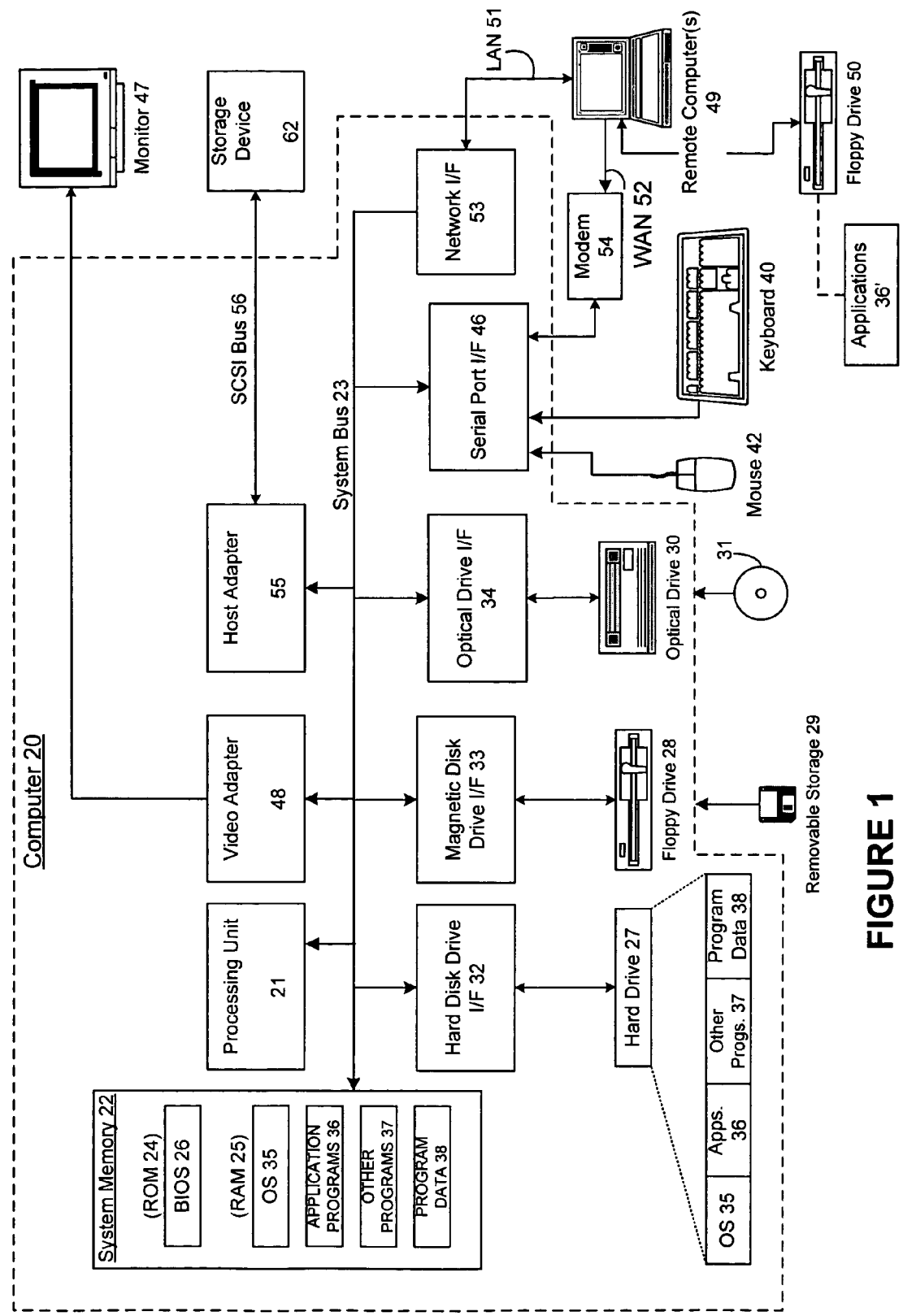
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer—such as magnetic cassettes, flash memory cards, digital video disks, Bernoulli cartridges, random access memories (RAMs), read only memories (ROMs) and the like—may also be used in the exemplary operating environment. Further, as used herein, the term computer readable medium includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2A:
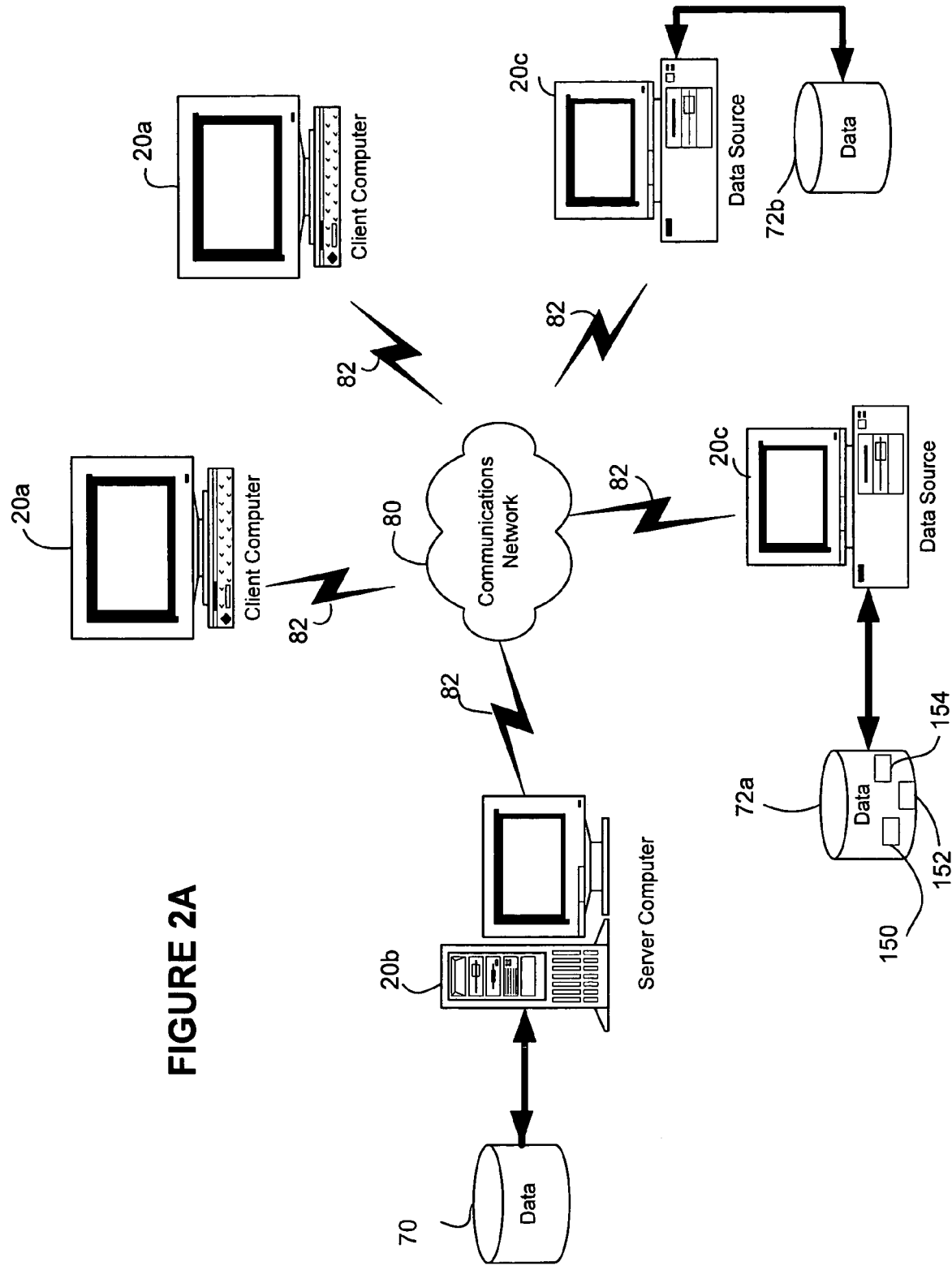
FIG. 2A is schematic diagram representing a network in which aspects of the present invention may be incorporated.

FIG. 2A illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2A, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

Database Architecture

Figure 2B:
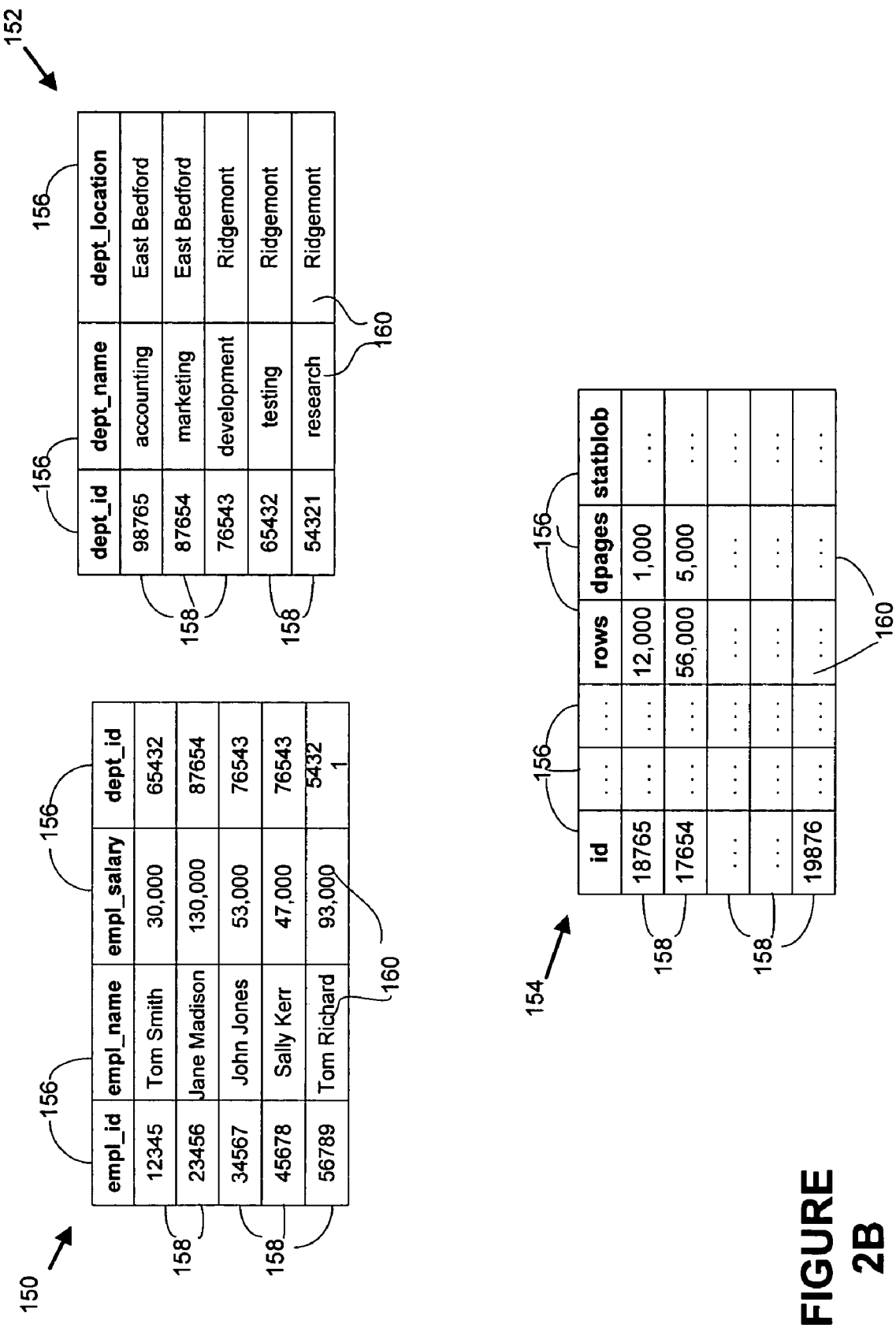
FIG. 2B is a diagram representing tables in an exemplary database.

A database is a collection of related data. In one type of database, a relational database, data is organized in a two-dimensional column and row form called a table. FIG. 2B illustrates tables such as tables 150, 152, and 154 that are stored in database 72a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

As shown in FIG. 2B, the exemplary database 72a comprises employee table 150, department table 152, and sysindexes table 154. Each table comprises columns 156 and rows 158 with fields 160 formed at the intersections. Exemplary employee table 150 comprises multiple columns 158 including empl_id, empl_name, empl_salary, and dept_id. Columns 158 in department table 152 include dept_id, dept_name, and dept_location. Sysindexes table 154 contains information regarding each table in the database.

Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective.

Figure 3:
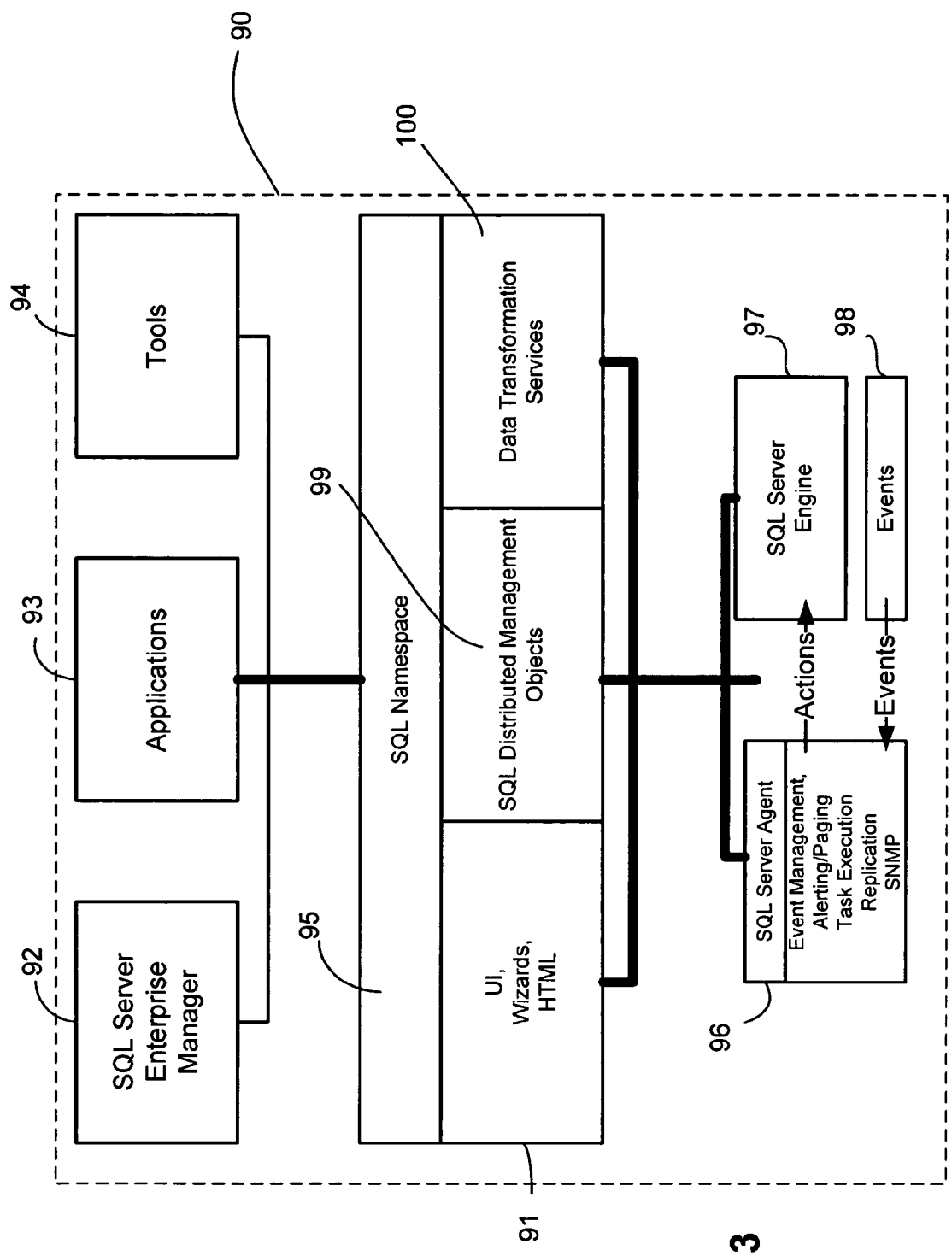
FIG. 3 is an architecture of an exemplary database management system.

As noted, control and management of the tables is maintained by a DBMS, e.g., a RDBMS. An exemplary SQL Server RDBMS architecture 90 is graphically depicted in FIG. 3. The architecture comprises essentially three layers. Layer one provides for three classes of integration with the SQL Server, comprising: (1) a SQL Server Enterprise Manager 92 that provides a common environment for managing several types of server software in a network and provides a primary interface for users who are administering copies of SQL Server on the network; (2) an Applications Interface 93 that allows integration of a server interface into user applications such as Distributed Component Object Modules (DCOM); and (3) a Tools Interface 94 that provides an interface for integration of administration and configuration tools developed by Independent Software Vendors (ISV).

Layer two opens the functionality of the SQL server to other applications by providing three application programming interfaces (API): SQL Namespace 95, SQL Distributed Management Objects 99, and Data Transformation Services 100. A user interface 91 is provided by Wizards, HTML, and so on. SQL Namespace API 95 exposes the user interface (UI) elements of SQL Server Enterprise Manager 92. This allows applications to include SQL Server Enterprise Manager UI elements such as dialog boxes and wizards.

SQL Distributed Management Objects API 99 abstracts the use of DDL, system stored procedures, registry information, and operating system resources, providing an API to all administration and configuration tasks for the SQL Server.

Distributed Transformation Services API 100 exposes the services provided by SQL Server to aid in building data warehouses and data marts. As described more fully below, these services provide the ability to transfer and transform data between heterogeneous OLE DB and ODBC data sources. Data from objects or the result sets of queries can be transferred at regularly scheduled times or intervals, or on an ad hoc basis.

Layer three provides the heart of the SQL server. This layer comprises an SQL Server Engine 97 and a SQL Server Agent 96 that monitors and controls SQL Server Engine 97 based on Events 98 that inform SQL Server Agent of the status of the SQL Server Engine 97.

The Server Engine processes SQL statements, forms and optimizes query execution plans, and so on.

Logical Database Application

Figure 4:
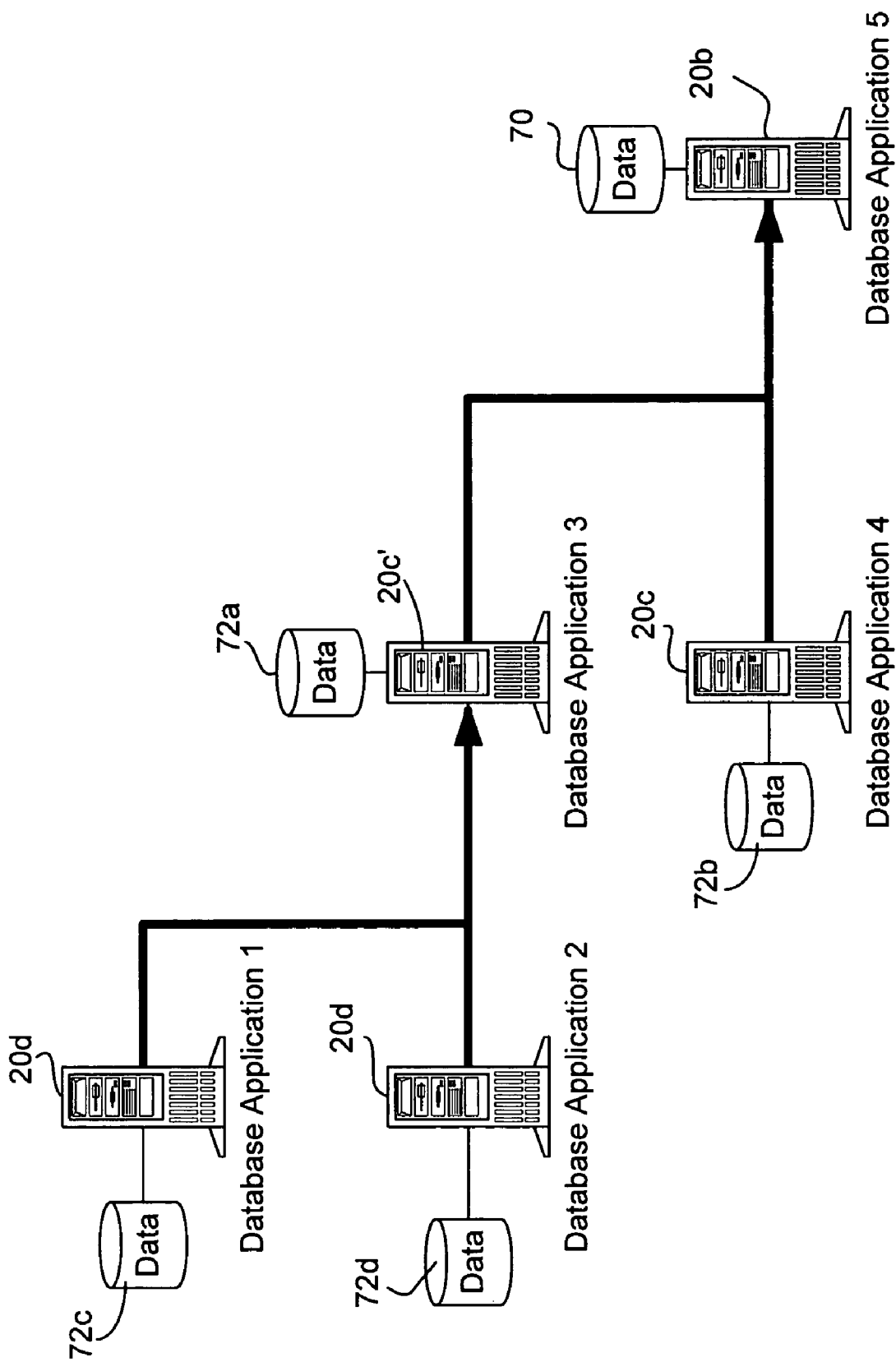
FIG. 4 is a network of database systems depicting the logical flow of data.

The above description focused on physical attributes of an exemplary database environment in which the present invention operates. FIG. 4 logically illustrates the manner in which data moves among a number of database servers, which may simultaneously be data sources for other database servers, to the destination database. Here, database server 20b provides management of database 70. Data for database 70 is provided by data sources 72a and 72b, which are managed by database servers 20c' and 20c, respectively. Significantly, database 20c' gathers data from databases 72c and 72d, which are managed by servers 20d. Thus, database 70 is fed directly with data from databases 72a and 72b and indirectly with data from databases 72c and 72d.

In the exemplary system of this figure, data from database 72c moves through database 72a and then on to database 70. Along the way, the data may also undergo transformation. This example illustrates the general concept how data movement may comprise several hops in order for such data to actually reach the database server of interest. Those skilled in the art will recognize that many other combinations of movement and transformation of data is possible.

Figure 5:
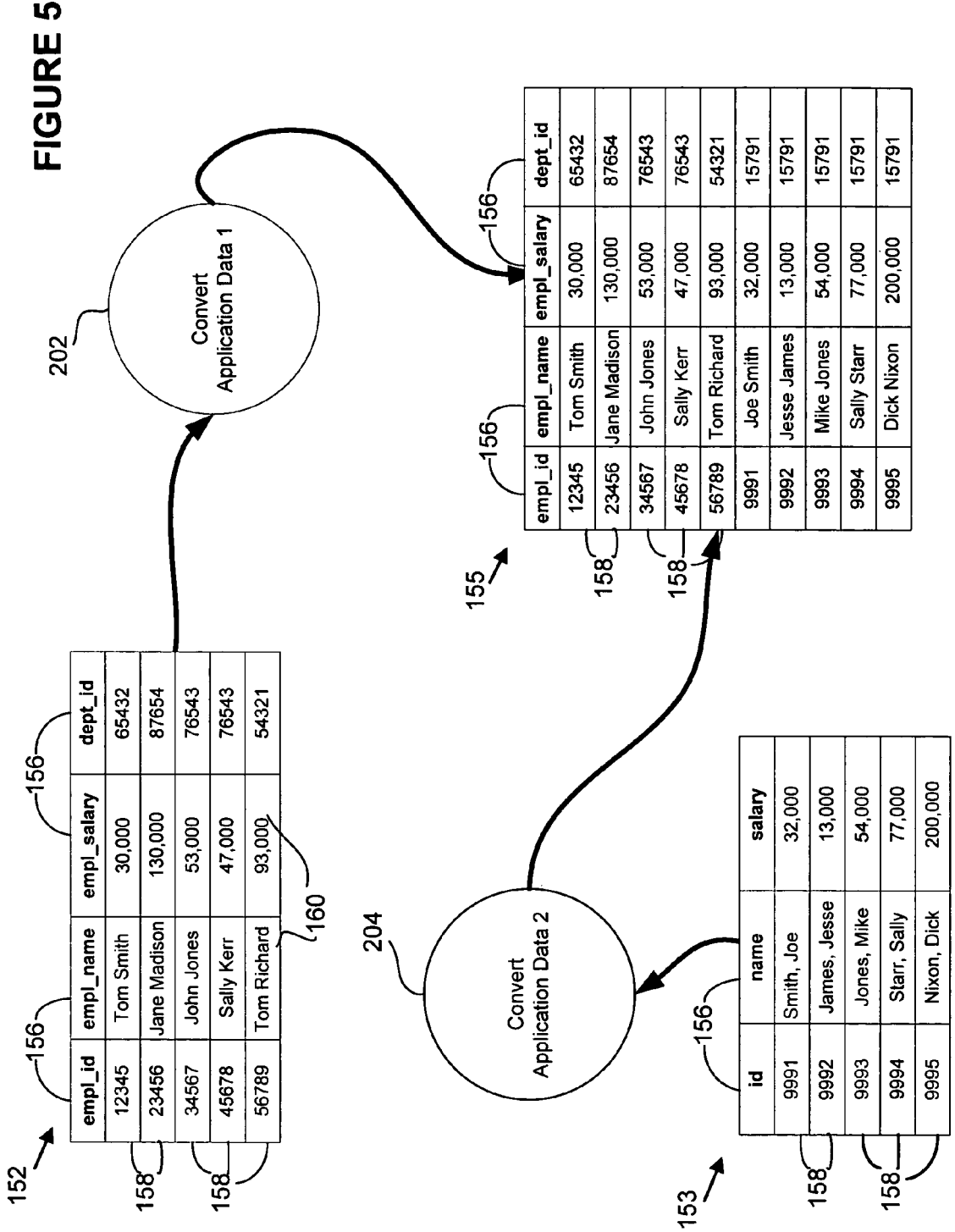
FIG. 5 is a diagram showing an ETF-based transformation of data as it moves between databases.

FIG. 5 illustrates a transformation using multiple ETL tools. In this exemplary transfer, data is merged from two different tables that reside in two different databases into a third table residing in a third database. For example, table 150 resides in database 72a whereas table 149 resides in database 72b. The tables are merged into a third table 151 that is maintained in database 70.

Although both tables 149, 150 contain similar information, it is not in an identical format. As a result, the data must be transformed by separate ETL tools into the format of table 151. For example, table 150 maintains a column empl_name that contains employee names as first name followed by last name; whereas, table 149 maintains a column name that contains employee names as last name followed by first name. Table 151 contains employee names in the form of table 150. In order for the name columns of table 149 to be inserted into the empl_name column of table 151, the name must be converted to the proper form. Similarly, table 149 does not contain dept_id information.

The above example illustrates that data moving between databases may need to be transformed in some manner before insertion into the target database. However, using separate ETL tools to achieve each transformation is inefficient. In FIG. 5, for example, transformation application 204 (one ETL tool) transforms the data of table 149 into proper form for table 151 and transformation application 202 (a separate ETL tool) transforms the data of table 150 into proper form for table 151.

Data Transfer Service and Data Transfer Pipeline

The data transformation system (DTS) in one embodiment of the present invention comprises a capability to receive data from a data source (such as a data retrieval system that receives data from a source), a data destination and a capability to store transformed and or non-transformed data therein (a destination data storage system to store data), and a data transformation pipeline (DTP) that constructs complex end-to-end data transformation functionality (data flow executions or DFEs) by pipelining data flowing from one or more sources to one or more destinations through various interconnected nodes (that, when instantiated, become components in the pipeline) for transforming the data as it flows by (where the term transforming is used herein to broadly describe the universe of interactions that can be conducted to, with, by, or on data). Each component in the pipeline possesses specific predefined data transformation functionality, and the logical connections between components define the data flow pathway in an operational sense.

Figure 6B:
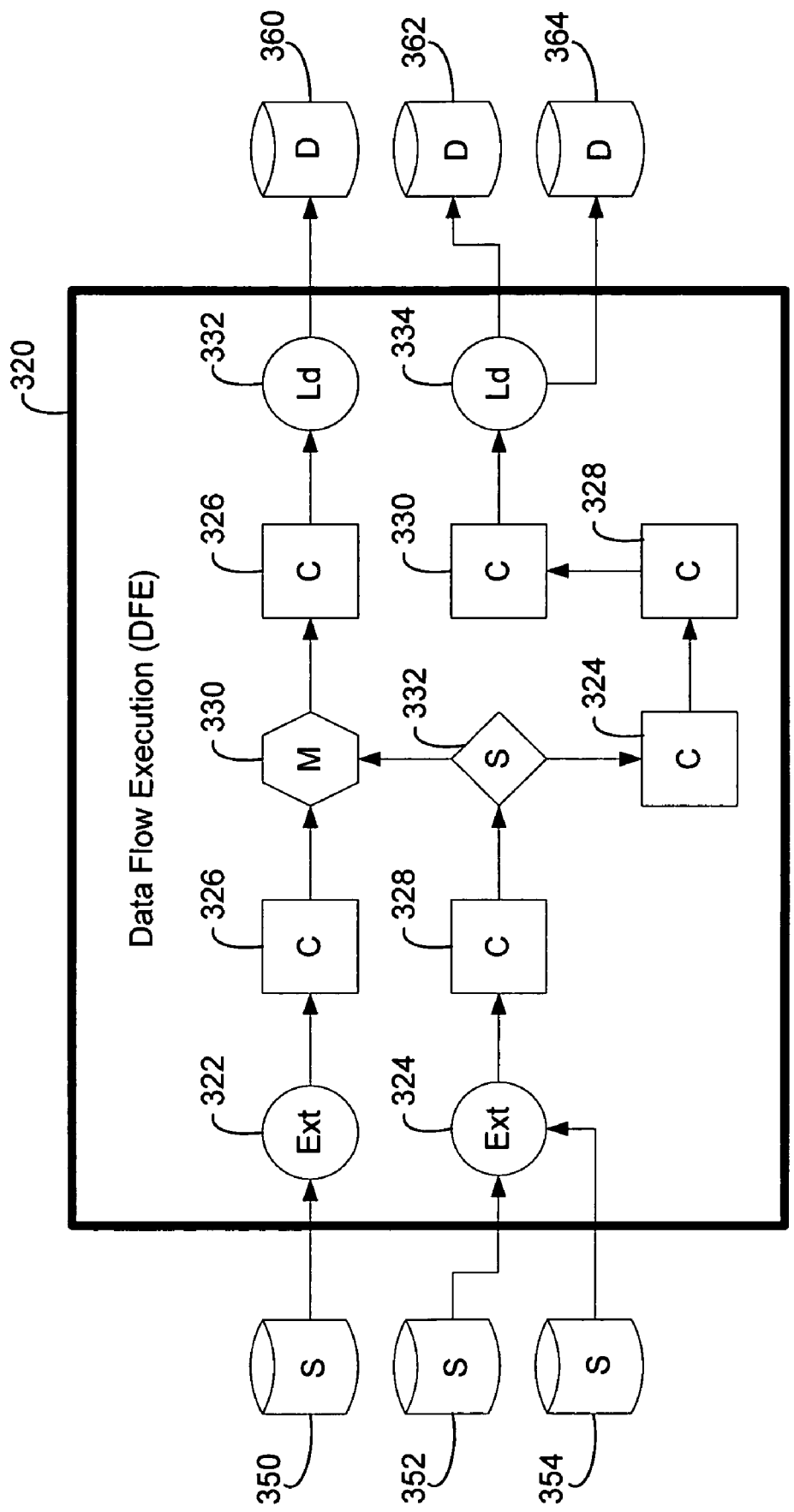
FIG. 6B is an illustration of data flow execution for the embodiment illustrated in of FIG. 6A.

The solution to the efficiency problem of traditional ETL-based transformations is the use of the data transformation pipeline of the present invention, the functional structure of one embodiment of which is illustrated in FIG. 6A. In this particular embodiment, the DTP 302 comprises a graphical user interface (GUI) 304 that enables a user 300 (represented here as a PC client computer) to develop a complex end-to-end data transformation function (a data flow execution or DFE) by graphically describing and representing a desired data flow from one or more sources to one or more destinations through various interconnected nodes (a graph). Each node in the graph represents specific predefined data transformation functionality that is offered by uninstantiated component objects 370 residing in a component library 316, and connections between the nodes as drawn by the user 300 represent the data flow pathway between the components for the graph.

After the user 300 inputs graph data 306 via the GUI 304, the DTP 302 utilizes a translator 308 to traverse the graph data 306 and to translate the graph into a DFE plan (not shown). Moreover, in the present embodiment, the translator 308 works in conjunction with an optimizer subsystem 310 to optimize the simple graph developed by the user 300 into a maximally efficient execution structure by eliminating redundancies, simplifying and enhancing the DFE plan and possibly performing a plethora of other optimizations that are known and appreciated by those of skill in the art. Based on the DFE plan, the scheduler 314 uses its pipeline engine 318 to build the actual DFE 320 by instantiating appropriate components objects 370 from the component library 316 (as detailed in FIG. 6B). The translator 308 also produces work lists 312 for the scheduler 314 where each work list 312 contains specific work items for the scheduler 314 to control the operation of the DFE 320; moreover, it is important to note that the actual interconnectivity between the various component objects is in effect reflect in the work lists as parameters associated with each work item in each work list. The DTP 302 also comprises a buffer 380 which is utilized by the DFE 320 (the role of which is described more fully later herein).

Notwithstanding the name, the scheduler 314 does not schedule work items according to time, but instead the scheduler 314 manages the work lists 312 and the execution of the work items in the lists by the DFE 320. Each work item in a work list is one of five operations that the scheduler 314 uses to control the operation of the DFE 320, the five operations comprising:
  extracting data from a data source
  providing data to a component (for transformation)
  splitting data from a single path onto two or more paths
  merging data from two or more paths into a single path
  providing data to a data destination Referring to both FIGS. 6A and 6B, the latter of which is a detailed view of the DFE 320, the first operation, extracting data from a data source, is a work item that causes the scheduler 314 to thread/task/program/schedule/etc. (hereinafter, simply to thread) a specific extraction component—for example, extraction component 322—to extract certain data from a certain data source—for example, data source 350—and for the extraction component 322 to logically hold that data to be passed to another component although, in reality, the data is actually stored in a buffer 380. The second operation, providing data to a component, causes the scheduler 314 to thread a specific component—for example, transformation component 326—to transform the data according to the input/output functionality of the component 326. (As described more fully below, in operation the scheduler 314 actually passes primary pointers for the buffer data to the component so that the component can directly access the data in the buffer 380 and transform it without having to copy it.) The third operation, enabling the split of data along two or more paths, is a work item that causes the scheduler 314 to thread a specialized component—for example, split component 332—to analyze each row of data and, based on a specified criteria, group the data into one of two groups, alpha or omega, each of which will thereafter logically travel along separate paths of the pipeline during continuing execution of the DFE 320. Moreover, from this point forward, the scheduler 314 treats alpha and omega as distinct and separate data groups. The fourth operation, enabling the merger of data from two or more paths into a single path, is the logical converse of a split that causes the scheduler 314 to thread another specialized component—for example, merge component 330—to merge two distinct and separate data groups into a single data group that travels along a common path in the pipeline during continuing execution of the DFE 320, and from this point forward the scheduler 314 treats the merged data as a single group. The fifth operation, loading data to a data destination, is a work item that causes the scheduler 314 to thread a specific loading component—for example, loading component 332—to load certain data onto a certain data destination—for example, data destination 360. These five operations comprise the general functionality of the scheduler 314, although it is the specific input/output functionality of the uninstantiated component objects 370 that are available to the DTP 302 (and which are threaded to by the five operational elements) that enable the development of complex data transforms.

As previously alluded to herein above, the DTP 302 has a multitude of uninstantiated component objects categorized in a component library 316, each of which has defined inputs and outputs from which the user can graphically construct complex data transformations (via the pipeline engine 318) by combining the functionality of the components into a DFE 320 in order to achieve a desired end results. The transformation components are similar to a plurality of ETL tools but individually lack the individual functionality of ETL tools to extract and load data (as these tasks are handled by the scheduler in the DTP system through special, non-transformation components such as the extract components 322 and the load components 334). Moreover, all of the components provide black box transformation functionality—that is, components can be developed on a variety of platforms (Java, ActiveX, etc.) because the development platform is irrelevant to the DTP 302 as it (and the user 300) are only concerned about the inputs and outputs for the component—that is, the functional information necessary to use the component as a black box object.

Referring again to FIGS. 6A and 6B, after the DFE 320 is formed by the pipeline engine 318 as described earlier herein, the scheduler begins executing the individual work items in one of the work lists 312, the individual work items of which are textually depicted FIG. 6B. For example, in executing a work list 312, the scheduler might individually thread the extraction components 322 and 324 to extract data from three data sources 350, 352, and 354 to create two data groups (which are stored as two distinct data groups, A and B respectively, in the buffer 380). Upon each completed extraction, the scheduler then threads the appropriate transformation component 326 or 328 to begin transforming the data corresponding to each path (A and B respectively). When component 326 is complete, and presuming that component 326 is complete before component 328, the scheduler recognizes that the next step for data group A (hereinafter A) is to merge with data from a split process 322 and, since that data is not yet available, the scheduler may not yet initiate the thread for the merger component 330. Meanwhile, component 328 completes its transformation of data group B (hereinafter B) and the scheduler 314 then threads the split component 332 to split B according to input parameters specified by the work item. Consequently, B is logically split into B1 and B2, each data group being the output of component 332 along separate paths in the DFE 320. Once the split is complete the scheduler 314 then threads the merger component 330 to merge A and B1. Also, recognizing that the remaining execution of B2 is independent from the continuing execution of A and B1, the scheduler 314 also threads component 324 to transform B2.

Without further regard to each remaining pathway, and to summarize the rest of the dataflow in the DFE 320 (without explicitly referring to the scheduler 314, the operation of which can be easily implied), A and B1 are merged by component 320 to form AB, which is then transformed by component 326 and thereafter loaded to an external data destination 360 by loading component 332. Meanwhile, B2, having been transformed by component 324, is then transformed by components 328 and 330 in order, and thereafter B2 is loaded to two external data destinations 362 and 364 by loading component 334.

The scheduler of the present invention, including the important translator/optimizer functionality that has been separate in the figures for clarity but which may in fact be scheduler subsystems, performs a critically important role in the DTP. Not only does the scheduler enable a user to describe complex data transformations in a simple graph easily drawn via the GUI interface, and not only does the scheduler (via the translator) map the graph to a DFE plan and task lists, but it also controls the actual execution of the data flows throughout the actual DFE to ensure consistent functionality for situations such as: pipelining data through a DFE comprising both synchronous and asynchronous components (where the latter requires all data to be inputted before any data can be outputted); keeping data in sequence when necessary while employing parallel processing techniques; load balancing; enabling parallel processing despite the data residing in a single location in memory (as discussed below); and so forth. Consequently, an important consideration for the present invention is the care given to ensuring that the relationship between elements in a graph and the DTPs capabilities are clearly defined and entirely consistent.

Memory Management

An important element for certain embodiments of the invention is unique memory management scheme utilized by the DTP whereby data extracted from an external source is placed in a memory buffer and is then manipulated by the components without the need for copying the data to any other location in memory. While logically we view the data to be moving from component to component in the DFE, the data does not in fact change locations but, instead, the data resides in the buffer and is operated upon by a series of components that, in turn, access the data in the buffer via pointers and manipulate same.

Figure 7A:
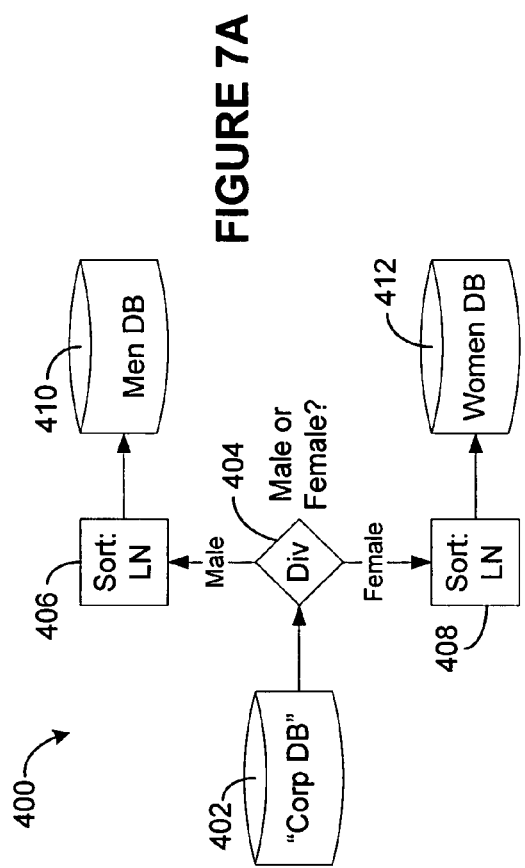
FIG. 7A is a diagram of a graph that a user might develop using the graphical user interface of one embodiment of the data transformation pipeline.

Consider FIGS. 7A, 7B, 7C, 7D, and 7E which collectively illustrates how data is (a) extracted by an extraction component and stored in buffer memory, (b) transformed by a component, and then (c) loaded to a destination from the buffer memory by a loading component. FIG. 7A (with references to other prior figures) illustrates a sample graph 400 for a data transformation specified by a user 300 via the GUI 304. The user 300 for this example has described that data regarding his subordinates employees should be extracted from the corporate database 402, divided into two groups based on sex (male or female) 404, each group then sorted by name 406 and 408 and, finally, each group loaded to the two separate databases 410 and 412.

Figure 7B:
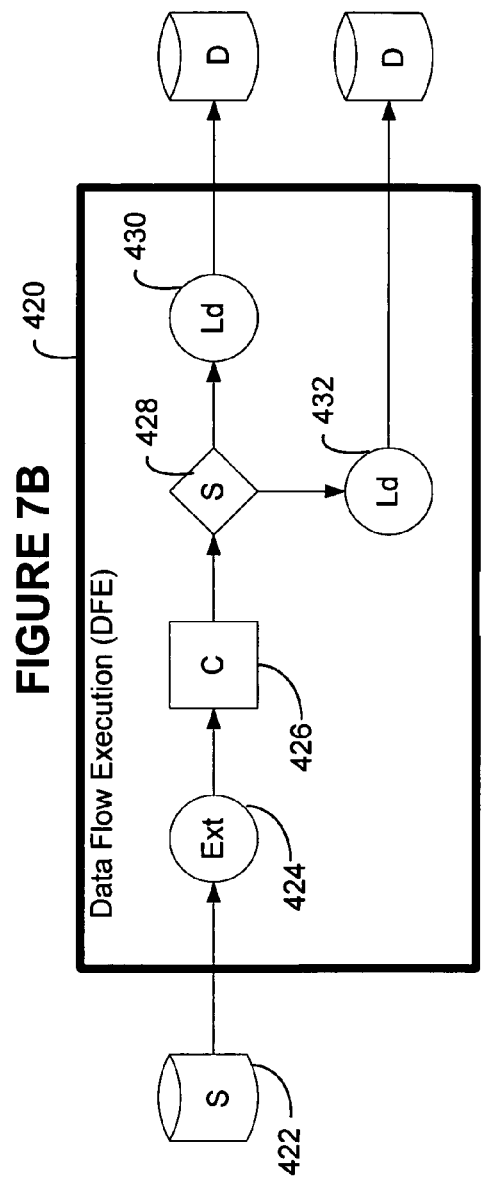
FIG. 7B is the optimized data flow execution for the user-defined graph illustrated in FIG. 7A.

FIG. 7B illustrates how the translator 308 and optimizer subsystem 310 (which, again, may in fact be subsystems of the scheduler 314) might translate the graph upon traversal into a DFE plan that pipeline engine 318 of the scheduler 314 would build from the component library. (The connectivity between objects is also reflected in the task list 312 that the translator would produce.) In this figure, the resultant DFE 420 comprises an extraction component 424 to extract the necessary data from an external data source 422. The data is then, in a logical sense, passed to transformation component 426 that sorts the data by last name. The data is then passed to a split component 428 to divide the data into a male group of data and a female group of data (Male and Female respectively). Male and Female are then loaded to separate external data destinations 434 and 436 by loading components 430 and 432 respectively. As an aside, it is important to note how the translator 308 and optimizer 310 implemented the graph to require only five components to achieve greater optimization (whereas a direct mapping of the graph would have required six components).

Figure 7C:
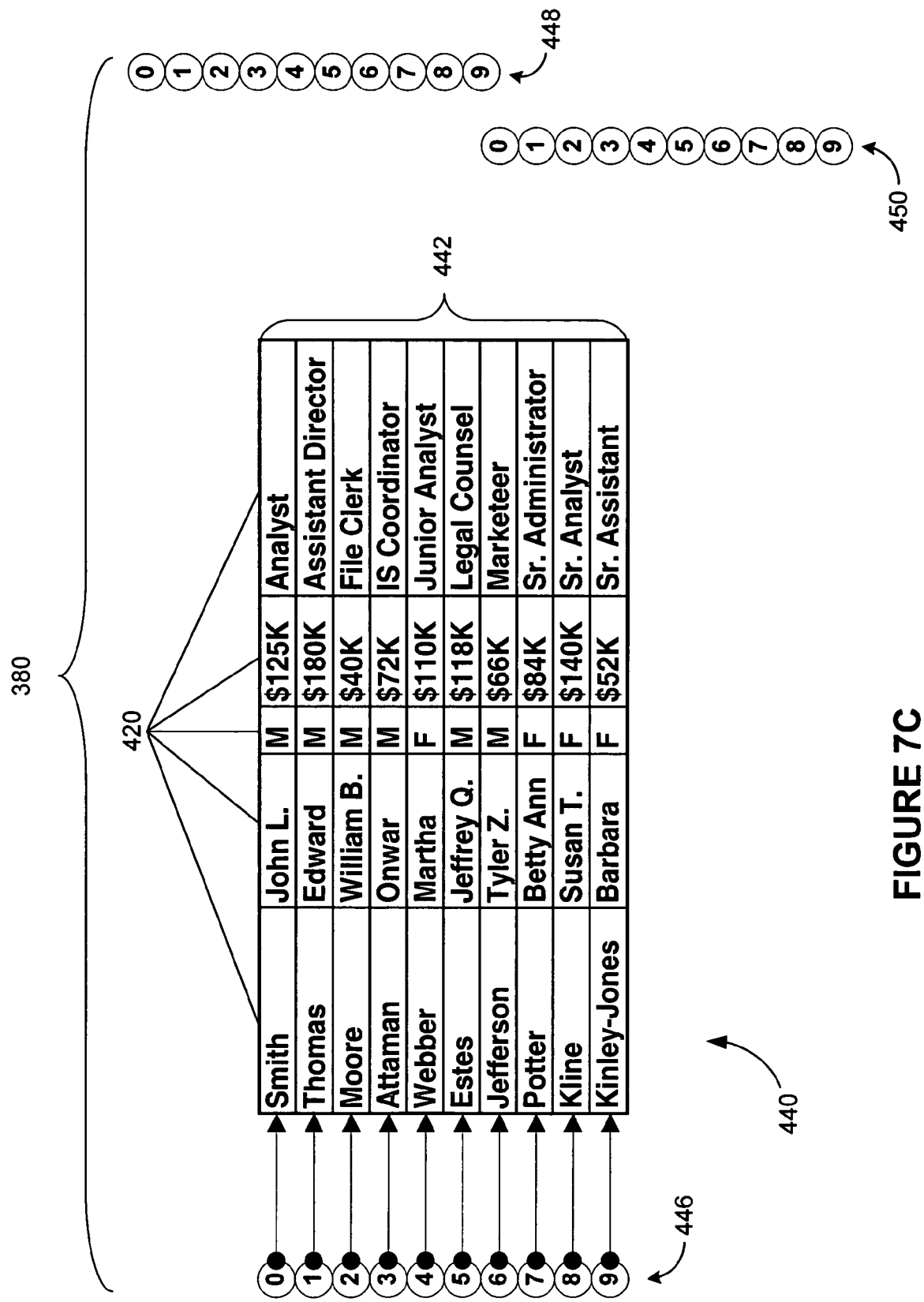
FIG. 7C illustrates the data stored in the buffer of the data transformation pipeline immediately after extraction and storage.
Figure 7D:
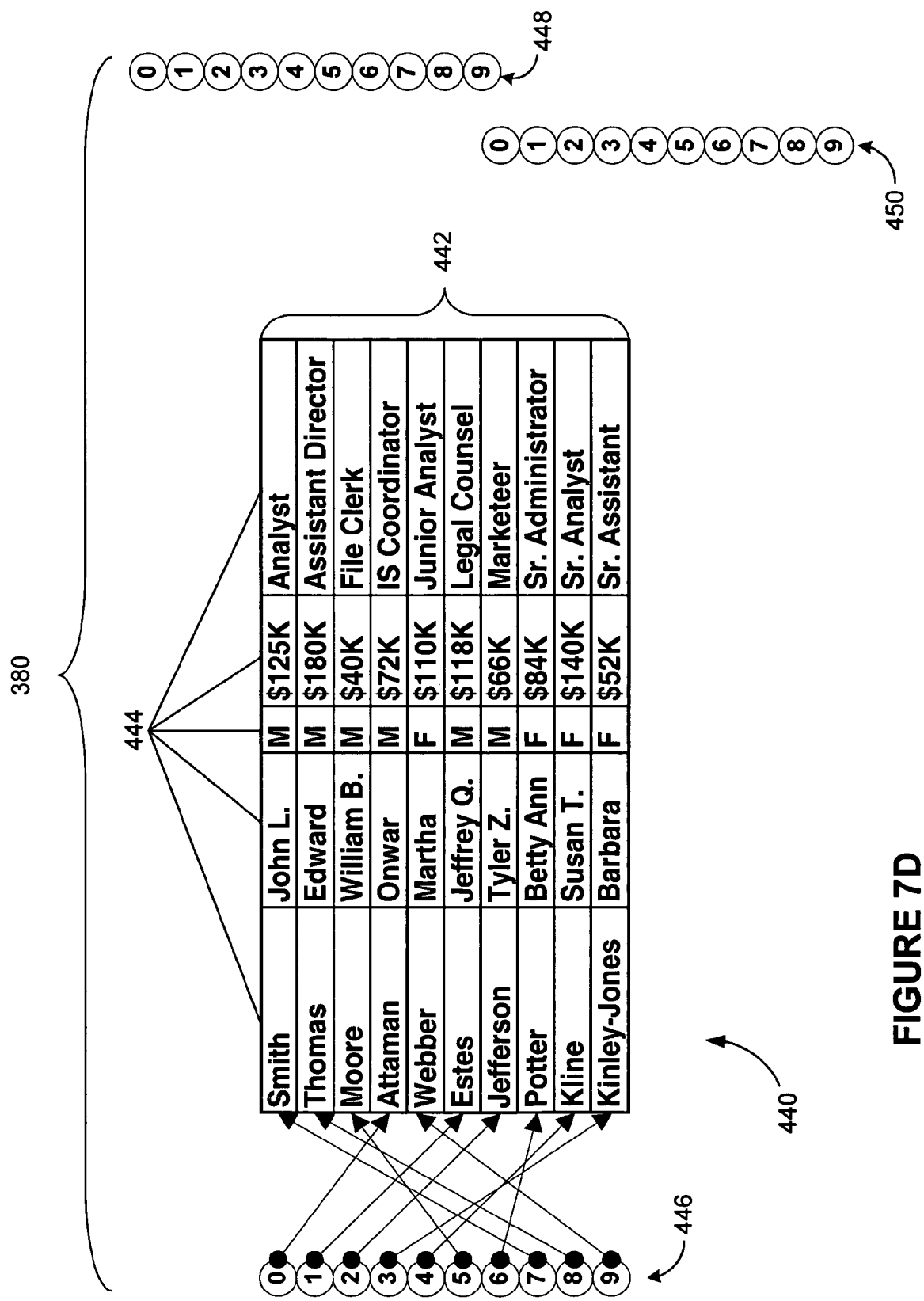
FIG. 7D illustrates the data stored in the buffer of the data transformation pipeline immediately after the data is transformed (sorted)

FIGS. 7C and 7D illustrate how the data is physically manipulated in the buffer 380 during initial execution of the DFE 320 both before and after the a sort occurs. Here the data is a table 440 comprising ten rows 442 of five columns each 444, each row containing a different record and each column containing a different record field. The data table is stored in the buffer 380 and primary pointers 446 are created and used to point to each row of data in the table 400. (Additional pointer sets 448 and 450 are also created but can be ignored for now as they will discussed in more detail later herein.) When the DFE passes the data to the first post-extraction component, the sorting component 426, the scheduler actually passes the primary pointers 446 to the transformation component 426, and it is the primary pointers 446 that are sorted by the transformation component 426 by changing which rows each pointer (which are ordered) actually points to, a technique well-known and appreciated by skilled artisans in the relevant art. Again, it is important to note that the data itself has not moved in buffer, nor has it been duplicated or copied to other memory or, in this case, otherwise manipulated.

Figure 7E:
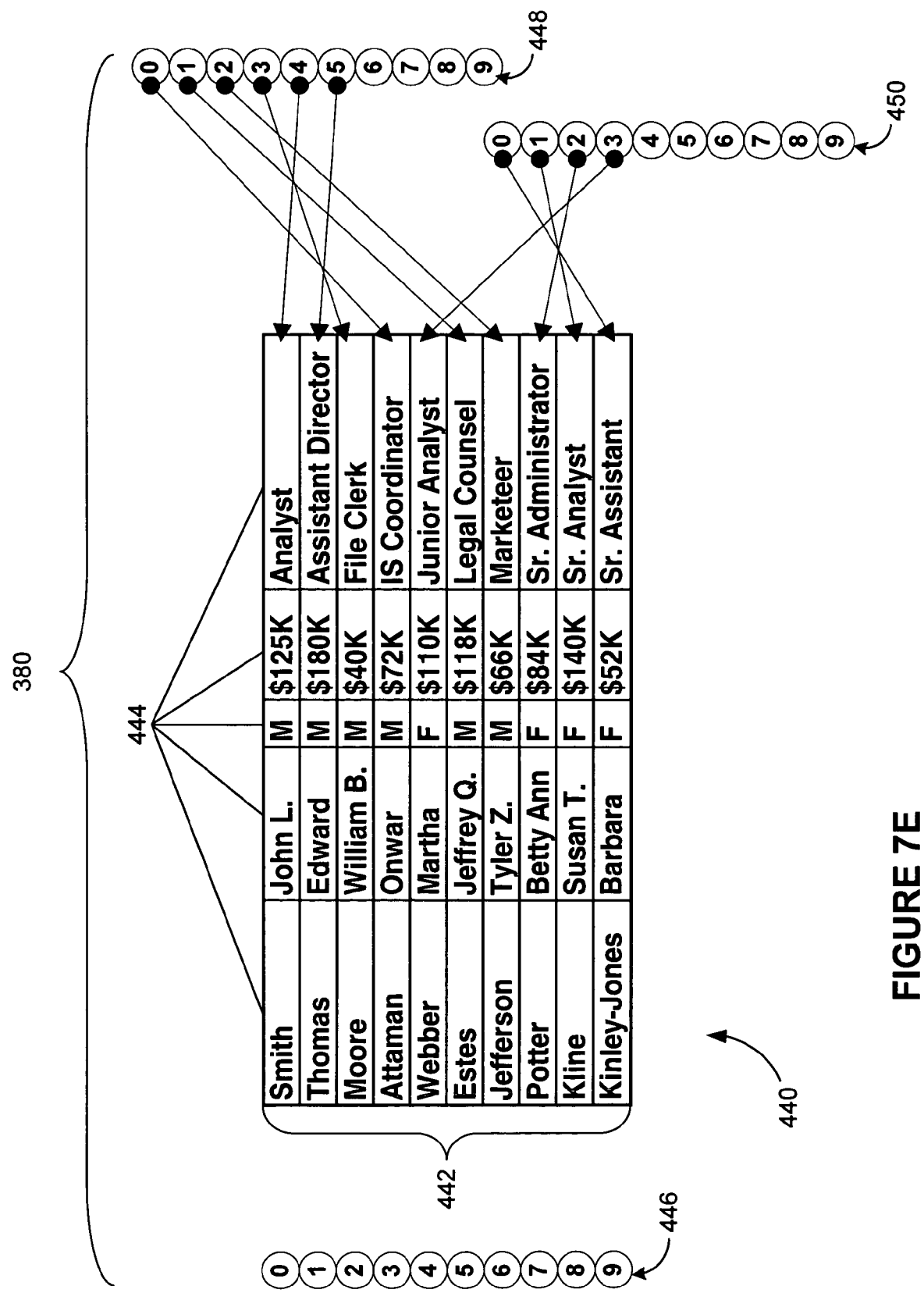
FIG. 7E illustrates the data stored in the buffer of the data transformation pipeline immediately after the data is split into two different data groups.

FIG. 7E illustrates how the data is physically manipulated in the buffer 380 during continued execution of the DFE 320. Having already been sorted, the data is then passed by the transformation component 426 to the split component 428 by passing the sorted pointers 446 to the split component 428. The split component then split the data into two groups, Male and Female, by pointing to the male rows with secondary pointers 448 and by pointing to the female rows with tertiary pointers 450. (During translation, the translator 308 recognized that a split would occur and, in anticipation of this split, the buffer created two additional sets of pointers 448 and 450 specifically for the functionality described herein.) Hereinafter, Male and Female are treated by the DFE as separate and distinct data groups and the primary pointers 446 are no longer relevant (in which case the scheduler 314, realizing the primary pointers 446 are no longer needed, could in fact destroy these pointers and release their resources back to the system; however, for convenience, the diagram mere shows the primary pointers no longer pointing to the data). Hereafter, the secondary pointers are then passed to loading components 430 and 432 respectively for those components to load their respective data Male and Female to their respective external data destinations 434 and 436. Note that throughout the entire DFE 320, the actual data in the buffer did not have to move, nor would any movement be necessary for a transformation component to modify any data cell (row by column) as it would simply do so by modify the actual data cell in the buffer memory directly.

Workplan Distribution

Given a data flow, various embodiments of the present invention are directed to the incorporation of a "collector" and a "distributor" to the planned workflow where the distributor acts on a complete buffer (an autonomous block of data suitable for processing in the pipeline) in each operation, for example, receiving a single buffer as input and directing that single buffer to one of several parallel identical threads to process that buffer. For various embodiments, the scheduler would create each of these multiple threads, each thread having an identical (redundant) strings of transforms (chains) downstream from the distributor, and all of which would lead even further downstream to a collector that is responsible for collecting and, if necessary, ordering the buffers processed by the previous redundant chains. In this way, the distributors and collectors provide increased scalability for the pipeline by implicitly partitioning (distributing) individual buffers to one of many threads for at least a part of their execution/processing.

Figure 8A:
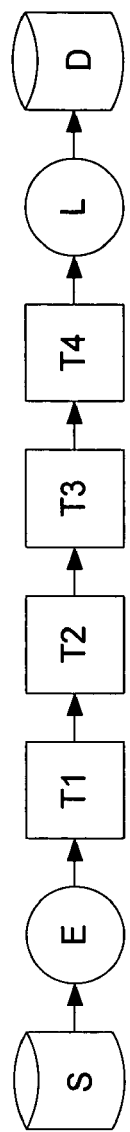
FIG. 8A illustrates an exemplary serial data pipeline.

For example, consider the hypothetical pipeline of FIG. 8A which comprises a source S, an extract component E, a serial plurality of transforms T1, T2, T3, and T4, a load component L, and a destination D. The extract component E will produce buffers based on data received from the source S, the load component will produce resultant data based on the processed buffers from the serial set of transforms, and both the extract E and the load L will operate with their own threads. Transforms T1, T2, T3, and T4 will all run on a third thread, and the processing of each buffer will be serialized through the four transforms—that is, T1 will not process a new buffer until T4 has handed the buffer off to the thread running the load component L for writing to the destination D. For various embodiments of the present invention, the scheduler will assure that all processors are fully utilized by managing the number of redundant chains and will also preserve ordering if necessary. For example, on machines with multiple processor resources available, the pipeline designer may employ collectors and distributors to allow the pipeline to create more threads for handling identical sets of parallel transformations as illustrated in FIG. 8B.

Figure 8B:
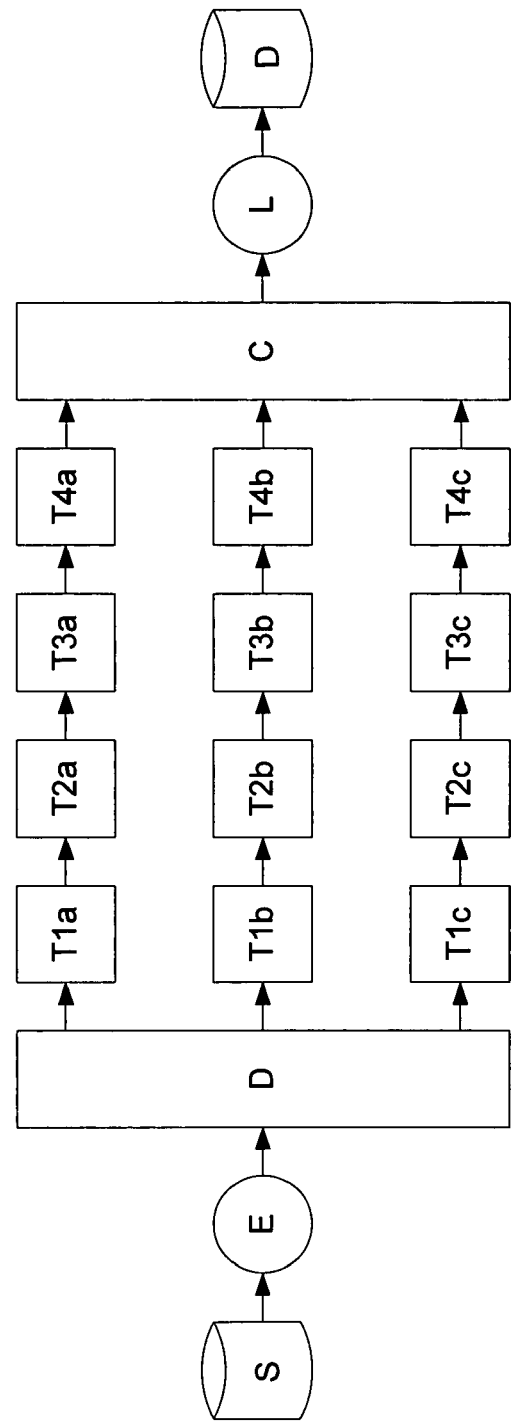
FIG. 8B illustrates the exemplary serial data pipeline of FIG. 8A that has incorporated multiple redundant transformation chains.

Interestingly enough, the parallelism achieved in FIG. 8B is only possible where each transform is "asynchronous." An asynchronous transform is one that can complete its processing and produces output on a single buffer without requiring any knowledge of data from other buffers—that is, the transformation that occurs only pertains to each buffer without regard for any other buffer on a buffer-by-buffer basis. In contrast, a "synchronous" transform is one that requires knowledge or awareness of buffers other than the current buffer being transformed. More simply, an asynchronous transform is one that does not need to see all of the data being transformed (and thus can be distributed), while a synchronous transform is one that does (and thus cannot be distributed).

Figure 9A:
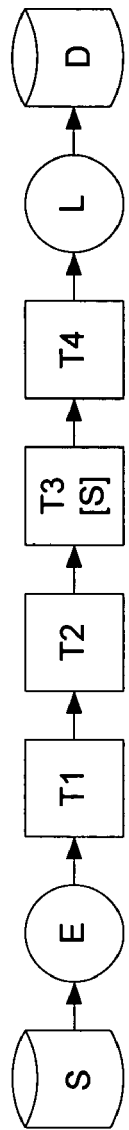
FIG. 9A illustrates an exemplary serial data pipeline with an asynchronous transform.
Figure 9B:
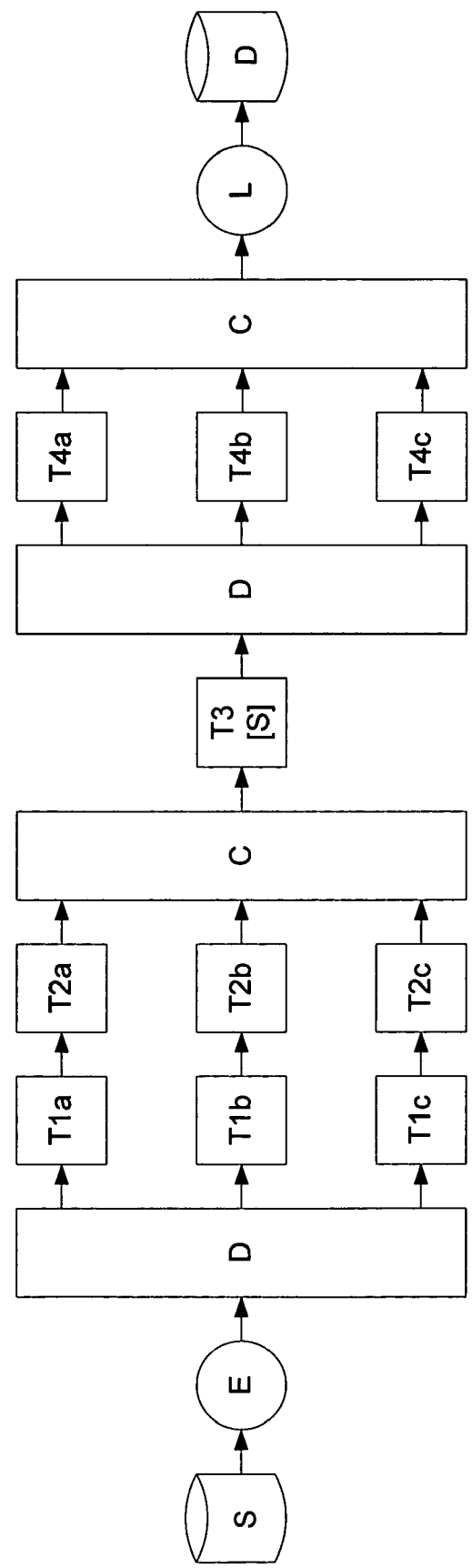
FIG. 9B illustrates the exemplary serial data pipeline of FIG. 9A that has incorporated multiple redundant transformation chains taking into account the asynchronous transform.

For example, consider the hypothetical pipeline of FIG. 9A which comprises a source S, an extract component E, a serial plurality of transforms T1, T2, T3, and T4, a load component L, and a destination D. In this figure, transform T3 is synchronous (as indicated by the bracketed S "[S]") and, since transform T3 is synchronous, it cannot be distributed. Thus, the parallelism achievable for this pipeline, illustrated in FIG. 9B, accounts for synchronous transform T3 by creating redundancy chains for the other transforms while preserving transform T3.

For certain embodiments of the present invention, a buffer may comprise special properties to facilitate the creation and operation of redundant chains. For example, certain embodiments may comprise the utilization of a property (stored in a buffer and understandable by the scheduler) that limits the maximum number of concurrent chains that may be employed (a "max-chain property"), while certain other embodiments may comprise the utilization of a property that informs the scheduler whether or not the order of the buffers upon entering a distributor must be preserved upon exiting the corresponding collector (that is, where ordering among the buffers must be preserved).

For several embodiments of the present invention, the addition of collectors and distributors is done automatically and is not intended to be part of the layout an end-user would define. Thus a layout would continue to represent simply the logical design of the pipeline that the user produced, while the scheduler would be responsible for integrating distributor and collector parallelism when possible and/or when beneficial. Thus, for these embodiments, it is the scheduler that will automatically create the redundant chains (including distributors and collectors) In addition, for ease of use, an end-user designing data flows would not need to consider the efficiencies to be gained by multiple processors as several embodiments of the present invention are intended to transform a pipeline designed for a single processor to be optimized for multiple processors through the use of distributors, collectors, and parallel chains of transforms. However, it is important for transform developers to kind in mind that a transform may be used in a distributed system as described herein and, as such, transform developers may designate whether their transform is in fact capable of being used in a parallel pipeline system as described herein. For certain embodiments, this is accomplished by the developer setting a value in a predesignated field of the transform that, as a default (or in the absence thereof) is set to not distributable.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers and PDAs, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed:

1. An automated processor-implemented method for automatically distributing a workplan for a data flow execution (DFE), said DFE comprising a chain of transforms having at least one chain of distributable transforms, said automated method comprising:
   automatically translating and optimizing, via the processor, a graph describing a desired data flow into the chain of transforms;
   automatically distinguishing non-distributable and distributable transforms in the chain of transforms including the at least one chain of distributable transforms;
   automatically scaling the chain of transforms for execution by:
      automatically adding to the chain of transforms at least one replica of said at least one chain of distributable transforms;
      automatically adding to the chain of transforms a distributor immediately upstream from, and coupled to, said at least one chain of distributable transforms and said at least one replica of said at least one chain of distributable transforms; and
      automatically adding to the chain of transforms a collector immediately downstream from, and coupled to, said at least one chain of distributable transforms and said at least one replica of said at least one chain of distributable transforms.

2. The method of claim 1 further comprising:
   said distributor receiving a set of buffers;
   said distributor distributing a first subset of said set of buffers to said at least one chain of distributable transforms; and
   said distributor distributes a second subset of said set of buffers to said at least one replica of said at least one chain of distributable transforms.

3. The method of claim 1 further comprising:
   said collector receiving a first subset of buffers from said at least one chain of distributable transforms;
   said collector receiving a second subset of buffers from said at least one replica of said at least one chain of distributable transforms; and
   said collector sending a set of buffers to a component downstream from said collector, said set of buffers comprising said first subset of buffers and said second subset of buffers.

4. The method of claim 3, wherein said set of buffers comprise an order, said method further comprising said collector reordering said set of buffers based on said order.

5. The method of claim 1 wherein said at least one chain of distributable transforms executes as a first thread and said at least one replica of said at least one chain of distributable transforms executes as a second thread.

6. An automated processor-implemented method for automatically distributing a workplan for a data flow execution (DFE), said DFE comprising a chain of transforms having at least one chain of distributable transforms, said automated method comprising:
   automatically translating and optimizing, via the processor, a graph describing a desired data flow into the chain of transforms;
   automatically distinguishing non-distributable and distributable transforms in the chain of transforms including the at least one chain of distributable transforms;
   automatically scaling the chain of transforms for execution by:
      automatically adding to the chain of transforms at least one redundant replica of said at least one chain of distributable transforms;
      for a set of buffers comprising a plurality of individual buffers, automatically distributing each individual buffer to either said at least one chain of distributable transforms or said at least one redundant replica of said at least one chain of distributable transforms.

7. An automated system comprising a processor for automatically distributing a workplan for a data flow execution (DFE), said DFE comprising a chain of transforms having at least one chain of distributable transforms, said automated system comprising at least one subsystem for:

automatically translating and optimizing, via the processor, a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one replica of said at least one chain of distributable transforms;

automatically adding to the chain of transforms a distributor immediately upstream from, and coupled to, said at least one chain of distributable transforms and said at least one replica of said at least one chain of distributable transforms; and automatically adding to the chain of transforms a collector immediately downstream from, and coupled to, said at least one chain of distributable transforms and said at least one replica of said at least one chain of distributable transforms.

8. The system of claim 7 further comprising at least one subsystem for:

said distributor receiving a set of buffers;

said distributor distributing a first subset of said set of buffers to said at least one chain of distributable transforms; and said distributor distributes a second subset of said set of buffers to said at least one replica of said at least one chain of distributable transforms.

9. The system of claim 7 further comprising at least one subsystem for:

said collector receiving a first subset of buffers from said at least one chain of distributable transforms;

said collector receiving a second subset of buffers from said at least one replica of said at least one chain of distributable transforms; and said collector sending a set of buffers to a component downstream from said collector, said set of buffers comprising said first subset of buffers and said second subset of buffers.

10. The system of claim 9, wherein said set of buffers comprise an order, said method further comprising at least one subsystem for said collector to reorder said set of buffers based on said order.

11. The system of claim 7 further comprising at least one subsystem whereby said at least one chain of distributable transforms executes as a first thread and said at least one replica of said at least one chain of distributable transforms executes as a second thread.

12. An automated system for automatically distributing a workplan for a data flow execution (DFE), said DFE comprising a chain of transforms having at least one chain of distributable transforms, said automated system comprising a processor and at least one subsystem for:

automatically translating and optimizing a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one redundant replica of said at least one chain of distributable transforms;

for a set of buffers comprising a plurality of individual buffers, automatically distributing each individual buffer to either said at least one chain of distributable transforms or said at least one redundant replica of said at least one chain of distributable transforms.

13. A non-transitory computer-readable storage medium comprising computer-readable instructions for automatically distributing a workplan for a data flow execution (DFE), said DFE comprising a chain of transforms having at least one chain of distributable transforms, said computer-readable instructions comprising instructions for:

automatically translating and optimizing a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one replica of said at least one chain of distributable transforms;

automatically adding to the chain of transforms a distributor immediately upstream from, and coupled to, said at least one chain of distributable transforms and said at least one replica of said at least one chain of distributable transforms; and automatically adding to the chain of transforms a collector immediately downstream from, and coupled to, said at least one chain of distributable transforms and said at least one replica of said at least one chain of distributable transforms.

14. The non-transitory computer-readable storage medium of claim 13 further comprising instructions for:

said distributor receiving a set of buffers;

said distributor distributing a first subset of said set of buffers to said at least one chain of distributable transforms; and said distributor distributes a second subset of said set of buffers to said at least one replica of said at least one chain of distributable transforms.

15. The non-transitory computer-readable storage medium of claim 13 further comprising instructions for:

said collector receiving a first subset of buffers from said at least one chain of distributable transforms;

said collector receiving a second subset of buffers from said at least one replica of said at least one chain of distributable transforms; and said collector sending a set of buffers to a component downstream from said collector, said set of buffers comprising said first subset of buffers and said second subset of buffers.

16. The non-transitory computer-readable storage medium of claim 15, wherein said set of buffers comprise an order, said method further comprising instructions whereby said collector reorders said set of buffers based on said order.

17. The non-transitory computer-readable storage medium of claim 13 further comprising instructions whereby said at least one chain of distributable transforms executes as a first thread and said at least one replica of said at least one chain of distributable transforms executes as a second thread.

18. A non-transitory computer-readable storage medium comprising computer-readable instructions for automatically distributing a workplan for a data flow execution (DFE), said DFE comprising a chain of transforms having at least one chain of distributable transforms, said computer-readable instructions comprising instructions for:

automatically translating and optimizing a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one redundant replica of said at least one chain of distributable transforms;

for a set of buffers comprising a plurality of individual buffers, automatically distributing each individual buffer to either said at least one chain of distributable transforms or said at least one redundant replica of said at least one chain of distributable transforms.

19. A processor for automatically distributing a workplan for a data flow execution (DFE), said DFE comprising a chain of transforms having at least one chain of distributable transforms, said processor:

automatically translating and optimizing a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one replica of said at least one chain of distributable transforms;

automatically adding to the chain of transforms a distributor immediately upstream from, and coupled to, said at least one chain of distributable transforms and said at least one replica of said at least one chain of distributable transforms; and automatically adding to the chain of transforms a collector immediately downstream from, and coupled to, said at least one chain of distributable transforms and said at least one replica of said at least one chain of distributable transforms.

20. The processor of claim 19 wherein:

said distributor receives a set of buffers;

said distributor distributes a first subset of said set of buffers to said at least one chain of distributable transforms; and said distributor distributes a second subset of said set of buffers to said at least one replica of said at least one chain of distributable transforms.

21. The processor of claim 19 wherein:

said collector receives a first subset of buffers from said at least one chain of distributable transforms;

said collector receives a second subset of buffers from said at least one replica of said at least one chain of distributable transforms; and said collector sends a set of buffers to a component downstream from said collector, said set of buffers comprising said first subset of buffers and said second subset of buffers.

22. The processor of claim 21, wherein said set of buffers comprise an order, and said collector reorders said set of buffers based on said order.

23. The processor of claim 19 wherein said at least one chain of distributable transforms executes as a first thread and said at least one replica of said at least one chain of distributable transforms executes as a second thread.

24. A processor for automatically distributing a workplan for a data flow execution (DFE), said DFE comprising a chain of transforms having at least one chain of distributable transforms, said processor:

automatically translating and optimizing a graph describing a desired data flow into the chain of transforms;

automatically distinguishing non-distributable and distributable transforms in the chain of transforms including the at least one chain of distributable transforms;

automatically scaling the chain of transforms for execution by:

automatically adding to the chain of transforms at least one redundant replica of said at least one chain of distributable transforms;

for a set of buffers comprising a plurality of individual buffers, automatically distributing each individual buffer to either said at least one chain of distributable transforms or said at least one redundant replica of said at least one chain of distributable transforms.

* * * * *